United States Patent
Haynes et al.

(10) Patent No.: US 6,783,870 B2
(45) Date of Patent: Aug. 31, 2004

(54) SELF-BRAZING MATERIALS FOR ELEVATED TEMPERATURE APPLICATIONS

(75) Inventors: Gardner S. Haynes, Attleboro, ME (US); Bijendra Jha, North Attleboro, ME (US); Chen-Chung S. Chang, Attleboro, ME (US)

(73) Assignee: Engineered Materials Solutions, Inc., Attleboro, MA (US)

( * ) Notice: Subject to any disclaimer, the term of this patent is extended or adjusted under 35 U.S.C. 154(b) by 12 days.

(21) Appl. No.: 09/976,520

(22) Filed: Oct. 12, 2001

(65) Prior Publication Data

US 2002/0066769 A1 Jun. 6, 2002

Related U.S. Application Data

(60) Provisional application No. 60/240,773, filed on Oct. 16, 2000.

(51) Int. Cl.[7] ................... B32B 15/18; B32B 15/20; B23K 35/22
(52) U.S. Cl. ............ 428/653; 428/677; 428/685; 228/235.2; 228/235.3; 228/262.42; 228/253
(58) Field of Search ................... 428/653, 677, 428/685; 228/235.2, 235.3, 262.42, 253

(56) References Cited

U.S. PATENT DOCUMENTS

| | | | |
|---|---|---|---|
| 2,156,331 A | * 5/1939 | Chace | .......................... 427/311 |
| 3,076,260 A | 2/1963 | Roehl | |
| 3,750,253 A | * 8/1973 | Miller | .......................... 428/637 |
| 3,797,087 A | * 3/1974 | Allardyce et al. | ..... 29/890.034 |
| 3,912,152 A | * 10/1975 | Forand, Jr. | ................... 228/190 |
| 4,340,650 A | 7/1982 | Surya et al. | |
| 4,497,363 A | * 2/1985 | Heronemus | ................... 165/95 |
| 5,458,156 A | * 10/1995 | Okubo et al. | ............... 138/145 |
| 6,267,830 B1 | * 7/2001 | Groll | ........................... 148/531 |

FOREIGN PATENT DOCUMENTS

| | | | |
|---|---|---|---|
| EP | 0 238 433 A | | 9/1987 |
| EP | 0 278 030 A | | 8/1988 |
| JP | 56-095479 | * | 8/1981 |
| JP | 60-197833 | * | 10/1985 |

* cited by examiner

Primary Examiner—John J. Zimmerman
(74) Attorney, Agent, or Firm—Pearne & Gordon LLP

(57) ABSTRACT

This invention describes the roll bonding of Al and Ni-bearing Cu alloys to suitable substrates to produce self-brazing materials for the elevated temperature, aggressive environment application. The Al and Ni-bearing Cu alloy for the self-brazing layers can be obtained by cladding layers of elemental Ni and Al to Cu. The Al content in the self-brazing layers can be varied from 2 to 100%. The Ni content in the self-brazing Cu alloy can be varied from 10 to 100%. Additional alloying elements in the commercial Cu alloys such as Fe, Cr, Si, Mn, Sn and Zn are unavoidable. Trace elements in the commercial alloys such as Pb, Ag and As will also affect the brazing and shall be reduced.

31 Claims, 3 Drawing Sheets

Figure 3: Braze Joints of Ni/Cu/SS, Brazing Temperature 1200°C

Figure 4: Braze Joints of Ni/Cu/SS, Brazing Temperature 1130°C. The void is due to incomplete melting of Ni layer.

Figure 5: Braze Joints of Cu/Ni/SS, Brazing Temperature 1130°C

Figure 6: Braze joint of 50Cu/25Al/SS/25Al/50Cu, Brazing Temperature 1130°C

SELF-BRAZING MATERIALS FOR ELEVATED TEMPERATURE APPLICATIONS

This application is a non-provisional of provisional 60/240,773 Oct. 16, 2000.

BACKGROUND OF THE INVENTION

Cu clad stainless or carbon steels have been used in self-brazing applications in which a large number of joints, such as in the heat exchangers, is required. The self-brazing alloys with Cu cladding provide good wetting during the brazing and eliminate the use of flux. By roll bonding brazing alloys to a suitable base metal and forming a composite layer, the materials can meet a multitude of requirements simultaneously. Examples of these requirements are mechanical strength, chemical resistance, and heat transfer. Meanwhile, the self-brazing approach reduces part complexity and ensures a tight fit. Commercially available self-brazing alloys for the heat exchanger applications have been designed using commercially pure Cu as the brazing layer with base alloys of stainless and carbon steels selected for the mechanical strength and corrosion resistance. The useful upper temperature of brazed assembly produced from the conventional self-brazing materials is thus limited by the oxidation resistance of the Cu alloys.

Currently, elevated temperature heat exchangers are mostly brazed with Ni-based brazing alloys, which are produced by the rapid solidification process to obtain the necessary thin gauge. The cost of rapidly solidified Ni brazing alloys is high, and the available gauge and alloy chemistry is limited. However, the oxidation resistance requirements of heat exchangers and honeycomb structures preclude the use of Cu alloys in the brazed assemblies. Thus self-brazing alloys, which can be used at elevated temperature and cost effective as well, are needed.

SUMMARY OF THE INVENTION

Al and Ni-bearing Cu alloys have shown superior oxidation resistance in comparison to commercially pure Cu alloys. The observation of reduced oxidation weight gain of Al and Ni-bearing Cu alloys prompted the idea to use these alloys as the self-brazing layers to replace the commonly used commercially pure Cu and as an alternative to Ni-based brazing alloys.

This invention describes self-brazing alloys for elevated temperature applications that are produced by the economical roll bonding process. In the roll bonding process, Al and Ni-bearing Cu alloy strips are clad to either one or both sides of suitable base alloys. (There is no need for the application of flux, nor for its subsequent removal to produce the brazed assemblies. The initial purchase cost of flux, as well as the cost associated with the disposal of cleaning by-product, can be largely eliminated.) The Al and Ni-bearing, self-brazing layer can be either Cu alloys containing the necessary Al and Ni addition or composites of Cu/Al or Cu/Ni. Furthermore, the composites are not limited to Cu/Al or Cu/Ni, but can also be, for example, Cu/Al/Cu or Cu/Ni/Cu.

DETAILED DESCRIPTION OF THE INVENTION

Figure 1:
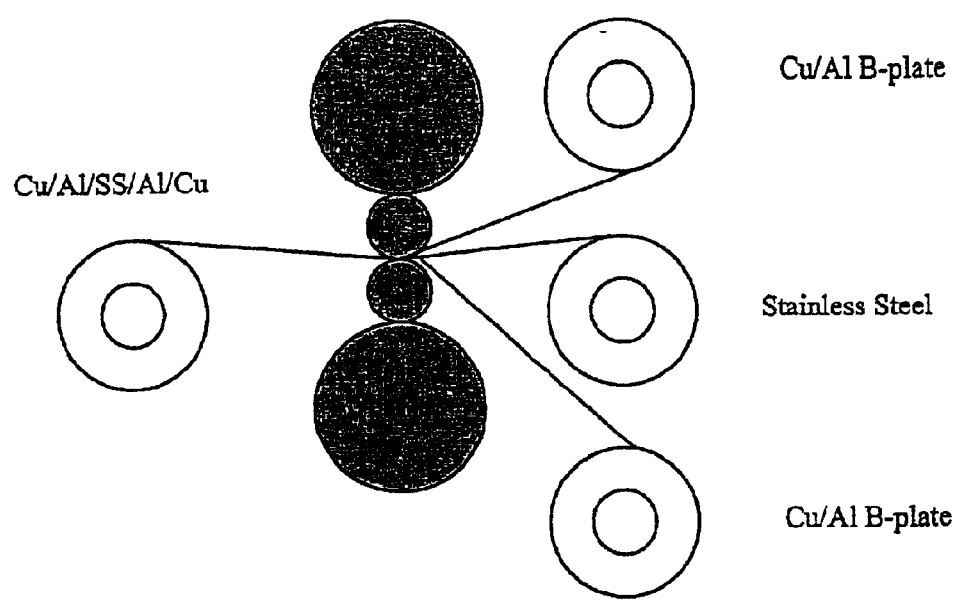
FIG. 1 is a schematic representation of a roll bonding process to obtain a five-layer, Cu/Al/SS/Al/Cu self-brazing alloy.

New self-brazing alloys are developed by replacing the commercially pure Cu alloys with claddings consisting essentially of Cu, Al or Ni alloy with additions. The Al, Ni-bearing Cu alloys can also be replaced by the composite of Cu/Al or Cu/Ni layers. Furthermore, the Cu/Al or Cu/Ni layers can be three layer infusions of Cu/Al/Cu, Al/Cu/Al, Ni/Cu/Ni and Cu/Ni/Cu. The elemental layers approach avoids the limitations imposed by the available commercial alloys. The chemistry of self-brazing layers can be varied by adjusting the layer ratio to satisfy the particular corrosion and oxidation resistance requirements. For example, improved oxidation resistance is obtained by increasing the Al content to a level beyond what is feasible from the conventional ingot materials. The usual undesirable impurity elements in the commercial alloys, such as Zn and Pb, are avoided as well when commercially pure Cu, Al and Ni alloys are used. The availability of commercially pure Cu, Al and Ni is much wider than the specific commercial Al and Ni-bearing Cu alloys. There are additional self-evident benefits with this approach. An example is that the gauge and finish conditions can be obtained by applying the conventional metal strip processing equipment.

EXAMPLES (1) Roll Bonding of Commercial Al and Ni-bearing Cu Alloys:

A commercially available Al-bearing copper alloy (CDA 6155) was roll bonded to a stainless steel substrate followed by cold rolling to 0.017" thick. CDA 6155 is a Cu alloy with a nominal composition of 5.5% Al, 1.5% Fe, 1% Ni, 0.8% Zn and 0.05% Pb. Commercially available Ni-bearing Cu alloys such as CDA 705 (10 wt % Ni) and CDA 725 (25 wt % Ni) were also roll bonded to stainless steel substrates and were able to be rolled to 0.017" gauge as well.

(2) Roll Bonding of One-sided Cu—Ni and Cu—Al Self-brazing Alloys:

One side of 316 stainless steels was roll bonded with Cu—Ni and Cu—Al composite layers. Table 1 lists the layer combinations and layer ratio. The layer sequences of Ni—Cu and Al—Cu were varied to investigate the effect on brazing and alloying. Cu to Al ratio also was varied to investigate the effect on alloy composition. The roll-bonded strips were cold rolled to 0.017" gauge and layer ratio was measured by cross sectioning the finished gauge samples.

TABLE 1

Bond Packages of Single Side-Self-Brazing Cu Alloys

| Alloy Designation | Layer 1 | Layer 2 | Layer 3 | Ratio (Vol. %) | Nominal Brazing Alloy Chemistry |
|---|---|---|---|---|---|
| Al/Cu/SS | 1145 Al 0.0075" | CDA110 Cu 0.030" | 316L SS 0.060" | Al/Cu/SS 5.5/21.3/73.2 | Cu-5 Al |
| Cu/Al/SS | CDA 110 Cu 0.030" | 1145 Al 0.0075" | 316L SS 0.060" | Cu/Al/SS 21.4/5.4/73.3 | Cu-5 Al |
| Cu/Ni/SS | CDA 110 Cu 0.030" | 201 Ni 0.010" | 316L SS 0.060" | Cu/Ni/SS 21.5/7.0/71.5 | Cu-25 Ni |
| Ni/Cu/SS | 201 Ni 0.010" | CDA 110 Cu 0.030" | 316L SS 0.060" | Ni/Cu/SS 7.1/21.3/71.6 | Cu-25 Ni |
| Cu/12Al/SS | CDA 110 Cu 0.030" | 1100 Al 0.012" | 316L SS 0.060" | Cu/012Al/SS 18.8/5.7/75.5 | Cu-8 Al |

Figure 2:
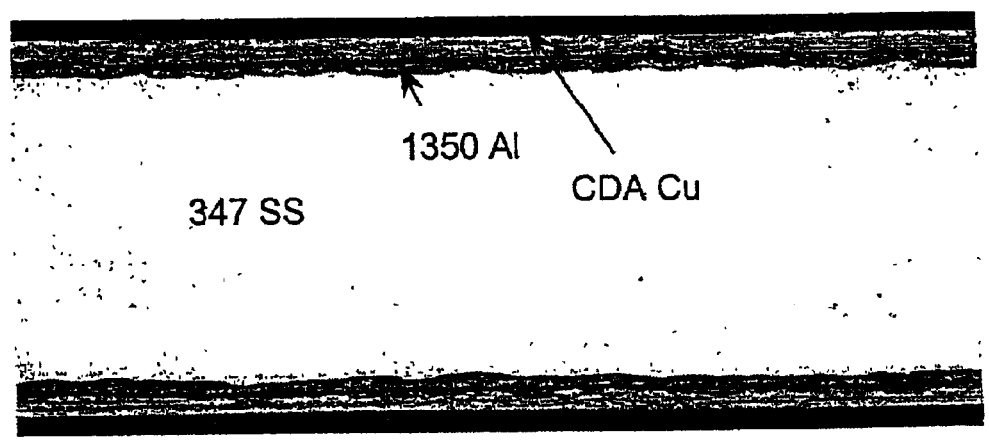
FIG. 2 is a representative cross-section of a five-layer composite of Cu/Al/SS/Al/Cu for self-brazing operations.

(3) Roll Bonding of Two-sided Cu/Al Layered Self-brazing Alloys:

A five-layer, Cu/Al/SS/Al/Cu, self-brazing alloy was produced by roll bonding commercially pure 1350Al and CDA110 Cu to AISI 347 stainless steel substrate and followed by cold rolling to 0.017" gauge. The thickness of CDA 110Cu was varied to obtain different layer ratio values. Cu and Al strips at gauges that indicated in Table 2 were cleaned, brushed and roll-bonded first to form the so-called B-plate. The B-plate was cold rolled to 0.0045" thick. Two B-plates and the 347 stainless steel strip were cleaned and brushed followed by roll bonding to 0.025" gauge. The bonded five-layer material was cold rolled to the final gauge of 0.017". The final layer ratio for one side of the five-layer composites is listed in Table 2. FIG. 1 shows the schematic of a roll bonding process to obtain the finished five-layer, Cu/Al/SS/Al/Cu self-brazing alloys using two Cu/Al B-plates. Representative cross section of a finished five-layer composite is shown in FIG. 2.

TABLE 2

Bond Packages of Two Side Self Brazing Cu Alloys

| Alloy Designation | Cu Layer | Al Layer | SS Layer | Final Ratio (Vol. %) |
|---|---|---|---|---|
| 60Cu/25Al/SS/ 60Cu/25Al | CDA110 Cu 0.060" | 1350Al 0.025" | 347 SS 0.040" | Cu/Al/SS 6.6/2.4/81.8 |
| 50Cu/25Al/SS/ 50Cu/25Al | CDA110 Cu 0.050" | 1350Al 0.025" | 347 SS 0.040" | Cu/Al/SS 5.8/2.7/82.1 |
| 40Cu/25Al/SS/ 40Cu/25Al | CDA110 Cu 0.040" | 1350Al 0.025" | 347 SS 0.040" | Cu/Al/SS 5.6/3.4/81.9 |

(4) Brazing of Roll Bonded Commercial Cu Alloys:

Vacuums brazing of roll bonded CDA 6155 and CDA 725 self-brazing alloys, from example (1), were conducted in a vacuum furnace equipped with a diffusion pump. Brazing temperatures were selected based on the melting points of the Cu alloys obtained from alloy data sheets or from differential thermal analysis (DTA) technique when data was not available. Flat sheets of self-brazing alloys at finish gauge were brazed to corrugated stainless steel. Cross sections of brazed joints were examined to evaluate the flow behaviors. Table 3 lists the brazing conditions and brazes joint quality of the three alloys.

The self-brazing alloy with Al-bearing Cu alloy (CDA 6155) required a pre-brazing acid etching treatment to remove the oxide scale to prompt uniform wetting. Brazing of CDA 6155 self-brazing alloys without etching resulted in non-uniform wetting and manifested as localized brazing alloy accumulation. The self-brazing alloys with commercial Ni-bearing Cu alloy (CDA 725) did not require special surface preparation other than a solvent degreasing prior to the vacuum brazing operation.

TABLE 3

Brazing Conditions of Commercial Al and Ni Bearing, Self-brazing Cu Alloys

| Alloy System | Brazing Conditions | Surface Preparation | Braze Joint Quality |
|---|---|---|---|
| CDA725/316SS | 1200° C. | Degreased | Uniform Wetting |
| CDA6155/316SS | 1130° C. | Degreased | Localized Wetting |
| CDA6155/316SS | 1130° C. | Acid Etching | Uniform Wetting |

(5) Brazing of One Side Cu—Ni and Cu—Al Self-brazing Alloys:

Vacuum brazing of one side Cu/Ni and Cu/Al self-brazing alloys from example (2) was conducted in a vacuum furnace equipped with diffusion pump. Brazing temperature was selected according to the target alloy chemistry and verified by the DTA technique. Flat sheets of self-brazing alloys at finish gauge were brazed to corrugated stainless steel. Cross sections of brazed joints were examined to evaluate the flow behaviors. Table 4 lists the brazing conditions and brazes joint quality of the three alloys.

TABLE 4

Brazing Conditions of one-side Cu—Ni and Cu—Al self-brazing alloys

| Alloy System | Brazing Temperature | Surface Preparation | Braze Joint Quality |
|---|---|---|---|
| Al/Cu/SS | 1130° C. | Degrease | Non-uniform wetting |
| Cu/Al/SS | 1130° C. | Degrease | Uniform wetting |
| Cu/Ni/SS | 1130° C. | Degrease | Uniform wetting |
| Ni/Cu/SS | 1130° C. | Degrease | Non-uniform wetting |
| Ni/Cu/SS | 1200° C. | Degrease | Uniform wetting |
| Cu/12Al/SS | 1130° C. | Degrease | Uniform wetting |

Figure 3:
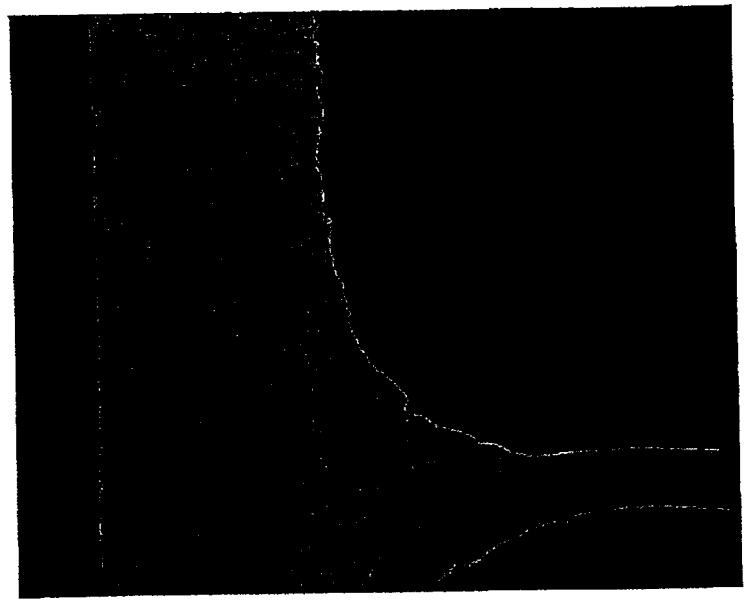
FIG. 3 is a cross-section of a Ni/Cu/SS joint brazed at 1200° C.
Figure 4:
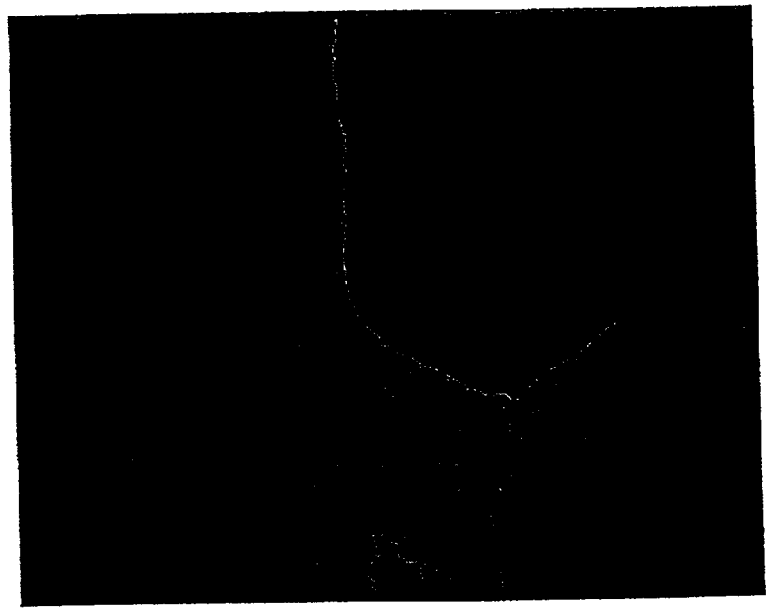
FIG. 4 is a cross-section of a Ni/Cu/SS joint brazed at 1130° C. and showing a void due to the incomplete melting of the Ni layer.
Figure 5:
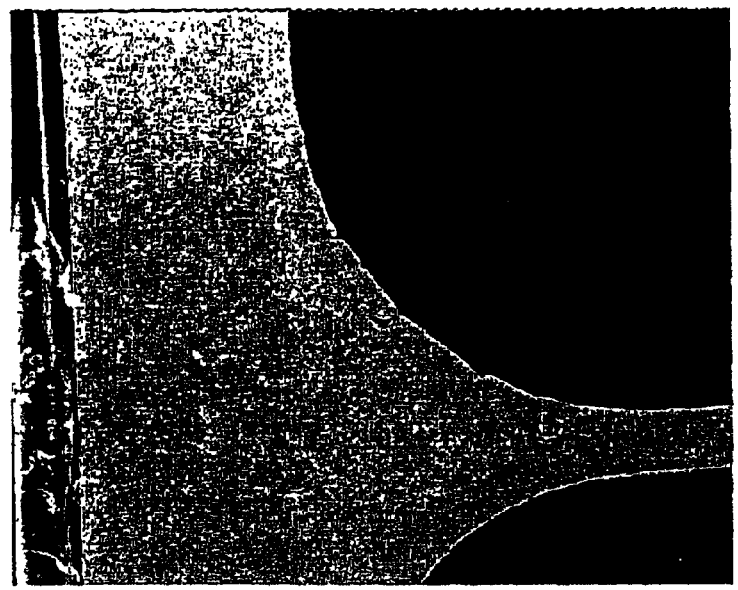
FIG. 5 is a cross-section of a Cu/Ni/SS joint brazed at 1130° C.

The braze joints of Al/Cu/SS alloys brazed to stainless steel showed uneven wetting when self-brazing alloy was degreased prior to brazing operation. It is likely that the stable scale on the surface of Al prevents an even wetting. This is in contrast to the case of Cu/Al/SS self-brazing alloy, of which a braze joint is of good quality and is wetted evenly. For Cu—Ni systems, self-brazing alloy with Ni as the outer layer (Ni/Cu/SS) required a higher brazing temperature to obtain good joints. FIG. 3 shows the braze joint for brazing temperature at 1200° C., while FIG. 4 shows the same clad alloy brazed at 1130° C. Lower brazing temperatures can be used for the Cu/Ni/SS self-brazing alloys (see FIG. 5).

(6) Brazing of Two Side Cu/Al/SS/Al/Cu Self-brazing Alloys

Figure 6:
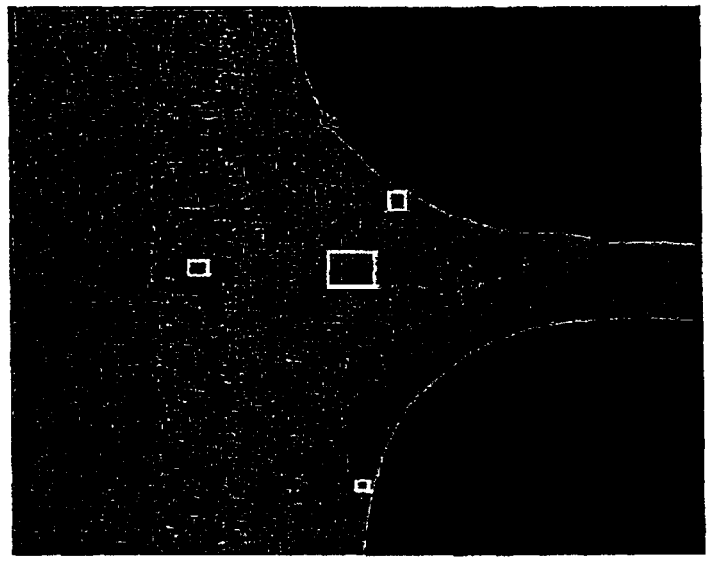
FIG. 6 is a cross-section of a Cu/Al/SS/Al/Cu joint brazed at 1130° C.

Table 5 lists the brazing conditions, surface preparation and braze joint quality of two side Cu/Al/SS/Al/Cu, self brazing alloys from example (3) in different Cu to Al ratio. All braze joints show uniform wetting with minimum surface preparation prior to brazing operation. Typical braze joint cross section is shown in FIG. 6.

TABLE 5

Brazing conditions for two sided Cu/Al/SS/Al/Cu and braze joint quality

| Alloy Designation | Brazing Temperature | Surface Preparation | Joint Quality |
|---|---|---|---|
| 60Cu/25Al/SS/25Al/60Cu | 1130° C. | Degrease | Uniform Wetting |
| 50Cu/25Al/SS/25Al/50Cu | 1130° C. | Degrease | Uniform Wetting |
| 40Cu/25Al/SS/25Al/40Cu | 1130° C. | Degrease | Uniform Wetting |

(7) Oxidation of Two Side Cu/Al/SS/Al/Cu Self-brazing Alloys:

Coupons of two-sided Cu/Al/SS/Al/Cu self-brazing alloys were heat-treated in vacuum to simulate the brazing condition. These heat treated coupons were oxidation tested by measuring the weight gain after 100 hours at 600° C. For comparison purpose, coupons of commercial Cu-clad self-brazing alloy, commercial CDA 6155 clad self-brazing alloy, also were vacuum heat-treated and oxidation tested. The results are summarized in Table 6. The conventional Cu clad self-brazing alloy show large weight loss due to spallation of the oxide scales. Commercial Al-bearing Cu (CDA 6155) self-brazing alloy showed weight gain results comparable to that of the Cu/Al/SS/Al/Cu alloys with the lowest Al to Cu ratio. Alloys with increased Al to Cu ratio showed less weight gain.

TABLE 6

Oxidation Weight Gain of Cu, CDA 6155 and Cu/Al/SS/Al/Cu Self-Brazing Alloys at 600° C. for 100 hours

| Alloy Designation | Oxidation Weight Gain (mg/cm$^2$) |
|---|---|
| 60Cu/25Al/SS/60Cu/25Al | 0.09 |
| 50Cu/25Al/SS/50Cu/25Al | 0.083 |
| 40Cu/25Al/SS/40Cu/25Al | 0.075 |
| Cu/SS/Cu | −2.95 |
| CDA6155/SS/CDA6155 | 0.089 |

(8) Oxidation of Ni-bearing Cu Alloys:

Two Ni-bearing Cu alloys were oxidation tested at 600° C. for 100 hours to identify the desirable range of Ni content for scaling resistance. Oxidation results for Cu alloy (CDA110) and Al-bearing Cu alloy (CDA6155) are also included in Table 7 for comparison. Significant weight losses were observed for Cu alloy. To a less extent, the 10%Ni-Cu alloys also exhibited significant weight loss. In comparison, the 30% Ni—Cu and Al-bearing Cu alloys all showed weight gains during the oxidation test.

TABLE 7

Oxidation Weight Gain of Cu, CDA 6155 and Ni-bearing Self-Brazing Alloys at 600° C. for 100 hours

| Alloy Sample | Weight Gain (mg/cm$^2$) |
|---|---|
| Copper | −54.6 |
| Alloy 6155 | 0.079 |
| 90/10 CuNi | −21.7 |
| 70/30 CuNi | 0.57 |

(9) Cu/Al/Cu as the Self-brazing Layers:

An alternative Cu/Al/Cu three layer, self-brazing B-plate was evaluated. Roll bonding of Cu/Al/Cu type B-plate was processed in a similar fashion as described in the previous examples. The starting Cu was of CDA 122 at the thickness of 0.0085" and 0.0055" respectively. Al was of the A1145 type at 0.0075" thick. Table 8 summarizes the Cu/Al/Cu strips being roll bonded to evaluate the Cu/Al/Cu self-brazing layers.

TABLE 8

B-plate of Cu/Al/Cu starting conditions and nominal alloy compositions.

| Alloy Designation | Cu Layer | Al Layer | Cu Layer | Ratio (Vol %) |
|---|---|---|---|---|
| 6% Al—Cu | 0.0055" | 0.0073" | 0.0055" | 30/40/30 |
| 4% Al—Cu | 0.0085" | 0.0073" | 0.0085" | 35/30/35 |

These Cu/Al/Cu B-plates were either further roll bonded to either AISI 316L stainless steel or INCO 625 strip to produce the self-brazing materials or cold rolled to 0.002" thick and used as straight brazing alloy. The self-brazing materials, as well as th straight brazing alloys, were vacuum brazed at 1080° C. to AISI 316L SS or INCO 625 respectively. The brazing joints were examined metallurgically by the optical and electron microscopes. The braze joints showed uniform alloy mixing and void filling.

Brazing Alloy Chemical Compositions:

(1) Al and Ni:

These are necessary alloying elements to provide the protective scales on the surface of Cu alloy. The minimum Al content for significant oxidation resistance will be 2 weight percent. Although it is reasonable to assume that by adding more Al to the alloy, the tendency of forming stable scale is higher, rapid depression of alloy melting point will render the alloy to be useless for elevated temperature applications. A practical upper limit for the Al content will be 20 weight percent as the melting point of the alloy is approximately 900° C. at this composition. The stable scale will be maintained in the CuNi alloy at 20 weight percent Ni. Addition of Ni will raise the melting point of the alloy rapidly and affect the brazing operation.

(2) Si:

Si is an effective melting point suppresser but the additional benefit of scale protection is less effective than Al. The melting point depression occurs quite rapidly and amount of Si that can be added shall be limited to less than 3 weight percent.

(3) Sn and Zn:

These are usual alloying elements present as by-products in the Cu alloys. These two elements are added as strengthening elements in Cu alloys. These are high vapor pressure elements that are detrimental to the vacuum brazing process and will be avoided.

(4) Pb:

Pb is added to improve the machinability of Cu alloys. Pb is also a high vapor pressure elements which affects the brazing process and shall be avoided as well.

(5) Fe, Co, Cr:

These elements are added for strengthening and are unavoidable in the commercial Cu alloys. An additional source of these elements is the dissolution of base alloys during the vacuum brazing process. These elements increase the melting points of the Cu alloys and should be minimized in order to avoid the freezing of brazing alloys before wetting is completed.

(6) Substrate Alloys:

Any metallic alloys with melting points that are above the self-brazing Cu alloys can be used. Stainless steels, either austenitic or ferritic, are preferred since these alloys posses oxidation and corrosion resistance that are compatible to the Al and Ni-bearing Cu self-brazing alloys. Nevertheless, other high temperature alloys based on Ni or Co are suitable as the substrate materials as well.

SUMMARY

Al and Ni-bearing Cu alloys are successfully roll-bonded to stainless steel and Ni-based alloy substrates to form a self-brazing material for elevated temperature applications.

For elevated temperature application, the Al content in the self-brazing layers can be varied from 2 to up to 100 wt %, preferably between 2 to 30 wt % while Ni content can be varied between 10 to up to 100 wt %, preferably between 20 to 40 wt %. The alloy may contain other elements such as Fe, Co, Cr and Ag without adversely affecting the oxidation resistance. Other unavoidable elements in the commercial Cu alloys such as Zn, Pb and As do not appear to affect the oxidation properties but shall be avoid due to the toxicity or high vapor pressure in vacuum.

The desirable Al and Ni-bearing alloy chemistry for elevated temperature, self-brazing applications can be produced by roll bonding the elemental alloy layers of suitable ratio to stainless steel substrates. The thus generated self-brazing alloys, when subjected to the brazing treatment, results in brazements with the desirable chemistry.

Al-bearing Cu self-brazing alloys show superior oxidation resistance in comparison to that of commercial Cu self-brazing alloys. Increased Al content improves the oxidation resistance.

It is preferable to have the Cu as the surface layer for the multi-layer, self-brazing materials. The Al alloys, when used as the outer layers and exposed to the ambient, tend to form stable scales, which adversely affect the brazing behaviors of the materials. Cu alloys can be easily cleaned by the conventional cleaning methods.

It is also preferable to have the Cu as the surface layer in the Cu/Ni/SS alloys. The higher melting point of Ni in comparison to that of Cu requires a higher brazing temperature in order to obtain a complete mixing of the layers.

The Al layers in the multi-layer, self-brazing materials provided additional oxidation resistance by forming a high Al layers on the substrates. This Al-rich layer is formed during the brazing cycle and adheres well to the substrates.

The brazing temperatures for Cu/Al/SS are comparable to that of Cu/SS self-brazing alloys. The fact that Cu is the outside layer allows the strip to be cleaned and handled as conventional Cu/SS self-brazing alloys.

What is claimed is:

1. A method comprising the steps of making a clad self-brazing alloy by providing a base metal alloy, providing a cladding consisting essentially of copper and aluminum, and pressing said cladding to said base metal alloy to bond said cladding to and form a brazing layer on said base metal alloy, said base metal ahoy having a melting point higher than said cladding, and brazing said self-brazing alloy to a metal surface at elevated temperature.

2. A method according to claim 1 wherein said pressing comprises the step of roll bonding to form a roll bonded composite.

3. A method according to claim 2, wherein said cladding is made from layers of commercially pure copper and commercially pure aluminum.

4. A method according to claim 3, wherein the thicknesses of the copper and aluminum layers are selected to produce a cladding consisting essentially of 2% aluminum to up to 100% aluminum.

5. A method according to claim 3, wherein the thicknesses of the copper and aluminum layers are selected to produce a cladding consisting essentially of 2% aluminum to 30% aluminum.

6. A method according to claim 3, wherein the thicknesses of the copper and aluminum layers are selected to produce a cladding consisting essentially of 5% aluminum and the balance copper.

7. A method according to claim 3, wherein the thicknesses of the copper and aluminum layers are 0.030" and 0.0075", respectively, prior to said roll bonding step.

8. A method according to claim 3, wherein the thicknesses of the copper and aluminum layers are 0.030" and 0.012", respectively, prior to said roll bonding step.

9. A method according to claim 3, wherein said base metal alloy is stainless steel.

10. A method according to claim 3, including the further step of cold rolling said roll bonded composite to a final gauge.

11. A method according to claim 10, wherein said final gauge is 0.017".

12. A method according to claim 3, wherein a layer of said cladding is provided on each side of said base metal alloy.

13. A method according to claim 12, wherein an outer layer on each side of said composite is a copper layer.

14. A method according to claim 3, wherein an outer layer of said composite is a copper layer.

15. A method according to claim 14, wherein an outer layer of said composite is said base metal.

16. A method according to claim 15, wherein said base metal is stainless steel.

17. A method according to claim 3, adjacent layers of copper and aluminum being metallurgically bonded to one another.

18. A method according to claim 1, said cladding being metallurgically bonded to said base metal alloy.

19. A method comprising the steps of making a clad self-brazing alloy by providing a base metal alloy, providing a cladding consisting essentially of copper and nickel, and pressing said cladding to said base metal alloy to bond said cladding to and form a brazing layer on said base metal alloy, said base metal alloy having a melting point higher than said cladding, and brazing said self-brazing allay to a metal surface at elevated temperature.

20. A method according to claim 19, wherein said pressing comprises the step of roll bonding to form a roll bonded composite.

21. A method according to claim 20, wherein said cladding is made from layers of commercially pure copper and commercially pure nickel.

22. A method according to claim 21, wherein the thicknesses of the copper and nickel layers are selected to produce a cladding consisting essentially of 10% to up to 100% nickel.

23. A method according to claim 20, wherein the thicknesses of the copper and nickel layers are selected to produce a cladding consisting essentially of 20% to 40% nickel.

24. A method according to claim 21, wherein the thicknesses of the copper and nickel layers are selected to produce a cladding consisting essentially of 25% nickel and the balance copper.

25. A method according to claim 21 wherein the thicknesses of the copper and nickel layers are 0.030" and 0.010", respectively, prior to said roll bonding step.

26. A method according to claim 1, wherein the pressing consists of the step or roll bonding said cladding to said base metal alloy to thereby metallurgically bond said cladding to said base metal alloy.

27. A method according to claim 26, further comprising the step of cold rolling said roll bonded composite to final gauge.

28. A method according to claim 1 or 19, said elevated temperature being at least 1130° C.

29. A method according to claim 1 or 19, said elevated temperature being 1130° C.

30. A method according to claim 1 or 19, said elevated temperature being at least 1200° C.

31. A method according to claim 1 or 19, said elevated temperature being 1200° C.

* * * * *